United States Patent
Kurtz et al.

(10) Patent No.: US 10,016,931 B2
(45) Date of Patent: Jul. 10, 2018

(54) METHOD OF FORMING A COMPOSITE THERMOPLASTIC MATERIAL WITH CONTINUOUS FIBER REINFORCEMENT BY STAMPING

(71) Applicant: DAHER AEROSPACE, Saint Julien de Chedon (FR)

(72) Inventors: Didier Kurtz, Pornic (FR); Julie Vaudour, La Chevroliere (FR)

(73) Assignee: DAHER AEROSPACE, Saint Julien de Chedon (FR)

( * ) Notice: Subject to any disclaimer, the term of this patent is extended or adjusted under 35 U.S.C. 154(b) by 0 days.

(21) Appl. No.: 14/381,587

(22) PCT Filed: Feb. 28, 2013

(86) PCT No.: PCT/FR2013/050431
§ 371 (c)(1),
(2) Date: Aug. 27, 2014

(87) PCT Pub. No.: WO2013/128138
PCT Pub. Date: Sep. 6, 2013

(65) Prior Publication Data
US 2015/0099091 A1    Apr. 9, 2015

(30) Foreign Application Priority Data
Feb. 29, 2012  (FR) ...................... 12 51877

(51) Int. Cl.
*B29C 70/38* (2006.01)
*B29C 65/02* (2006.01)
(Continued)

(52) U.S. Cl.
CPC ............ *B29C 65/02* (2013.01); *B29C 51/004* (2013.01); *B29C 70/222* (2013.01);
(Continued)

(58) Field of Classification Search
CPC ... B29C 70/386; B29C 70/388; B29C 70/222; B29C 70/345
See application file for complete search history.

(56) References Cited

U.S. PATENT DOCUMENTS 3,810,805 A * 5/1974 Goldsworthy ........ B29C 70/388
                                                156/271
4,948,355 A * 8/1990 Knoll ...................... B29C 43/04
                                                264/320
(Continued)

FOREIGN PATENT DOCUMENTS

| FR | 2766407 A1 | 1/1999 |
| WO | 0209935 A1 | 2/2002 |
| WO | WO2002009935 A1 * | 2/2002 |
| WO | 2012045969 A1 | 4/2012 |

OTHER PUBLICATIONS

Bigg, D.M. and J.R. Preston, Stamping of Thermoplastic Matrix Composites, Polymer Composites, vol. 10, No. 4 (Aug. 1989), pp. 261-268.*
Campbell, "Manufacturing Processes for Advanced Composites, Chapter 10 (Thermoplastic Composites : An Unfulfilled Promise)", Jan. 1, 2004, pp. 1-41, Elsevier advanced technology, Oxford, GB (XP002615944).

*Primary Examiner* — Matthew J Daniels
(74) *Attorney, Agent, or Firm* — Im IP Law; C. Andrew Im

(57) ABSTRACT

A method for forming a thermoplastic composite material with continuous fiber reinforcement by stamping. A flat blank comprising a pre-consolidated stack of plies by automatic fiber placement of fibers referred to as the thermoplastic pre-impregnated fibers is obtained. The flat blank is reheated to a temperature greater than or equal to the melting temperature of the thermoplastic polymer making up the matrix of the thermoplastic pre-impregnated fibers. The reheated flat blank is hot stamped and the part formed between the stamping punch and die is consolidated.

2 Claims, 1 Drawing Sheet

(51) Int. Cl.
  *B29C 70/34*   (2006.01)
  *B29C 70/22*   (2006.01)
  *B29C 51/00*   (2006.01)
  *B29D 99/00*   (2010.01)
  *B64C 1/06*    (2006.01)
  B29L 12/00     (2006.01)
  B29K 71/00     (2006.01)
  B29L 31/30     (2006.01)
  B64C 1/00      (2006.01)

(52) U.S. Cl.
  CPC .......... *B29C 70/345* (2013.01); *B29C 70/386* (2013.01); *B29D 99/001* (2013.01); *B64C 1/061* (2013.01); B29K 2071/00 (2013.01); B29L 2012/00 (2013.01); B29L 2031/3082 (2013.01); B64C 2001/0072 (2013.01); Y02T 50/433 (2013.01); Y10T 156/1043 (2015.01); Y10T 428/24132 (2015.01)

(56) References Cited

U.S. PATENT DOCUMENTS

| | | | | |
|---|---|---|---|---|
| 4,950,532 A | * | 8/1990 | Das | B29C 35/02 264/257 |
| 5,177,340 A | * | 1/1993 | Zaffiro | B29C 66/4722 219/388 |
| 6,613,258 B1 | | 9/2003 | Maison et al. | |

\* cited by examiner

2A

2B 2C
2D

METHOD OF FORMING A COMPOSITE THERMOPLASTIC MATERIAL WITH CONTINUOUS FIBER REINFORCEMENT BY STAMPING

RELATED APPLICATIONS

This application is a § 371 application from PCT/FR2013/050431 filed Feb. 28, 2013, which claims priority from French Patent Application No. 12 51877 filed Feb. 29, 2012, each of which is herein incorporated by reference in its entirety.

TECHNICAL FIELD OF THE INVENTION

The invention relates to a method for forming a composite thermoplastic material with continuous fiber reinforcement by stamping. The invention is particularly suited to the making of a composite structural part with at least two sides extending in secant planes, particularly the making of a part in the form of extrusion comprising at least two flanges, the centers of the successive sections of which follow a curve.

BACKGROUND OF THE INVENTION

In the prior art, a part of this shape made of composite material with continuous fiber reinforcement in a thermoplastic matrix could be obtained by stamping a consolidated thermoplastic blank. In that prior art, described for example in the document FR-A-2 922 276, a stack of pre-impregnated plies is compacted and consolidated in order to make up a plate. Nested parts are then trimmed out of the plate to make blanks, which blanks are then stamped by a punch-and-die device at a temperature close to or above the melting temperature of the matrix. A composite blank with fiber reinforcement is stamped without changing the thickness of the blank, the material of which cannot undergo plastic deformation. Thus, during the stamping operation, said blank is deconsolidated during heating so as to allow the inter-laminar slipping of the plies during forming, then compacted once again between the die and punch following stamping before it is consolidated once again and finally trimmed to eliminate the edges. FIG. 1 relating to the prior art schematically illustrates the direction of the fibers during certain steps of the method. Thus, in FIG. 1A, at the end of the consolidation of the composite plate (100), the plate in this embodiment comprises continuous fibers (110, 120), that is to say extending between two edges of said plate, oriented along angles at 0° (120) and 45° (110). Before stamping, in FIG. 1B, a plurality of blanks (130) is trimmed in that plate (100) for example by means of an abrasive water jet. The need to follow the direction of fibers imposes the direction of the blanks in the plate (100), which limits the possibilities of nesting parts and leads to large scrap rate. Besides, during that trimming stage, particularly when the blank (130) is curved, it is not possible to follow the nominal direction of fibers in all locations of the blank. Thus, the subsequent stamping operation generates tensions in the fibers, depending on their direction in relation to the forming direction. In the prior art, the use of a blank made out of a compacted and consolidated plate is indispensable for implementing the hot stamping method. That is because in order to achieve the inter-laminar slipping of the plies during forming, it is necessary for the heating temperature of the blank to be even, both at the surface and in the thickness. The presence of an air knife in the stratification, even over a short distance, creates a lack of heating, which is reflected in a point of fixation between the relevant plies, locally opposing the inter-laminar slipping and generating stresses in the fibers. Further, that air knife collects the products of the gas released when the blank is heated, thus creating porosity. To avoid those defects, the condition of the material of the consolidated plates (100) is systematically inspected in the prior art using ultrasound, before the blanks for stamping are trimmed. The document "Manufacturing processes for advanced composites", Chapter 10: pages 379-387, CAMPBELL F. C. ED., ELSEVIER ADVANCED TECHNOLOGY, Jan. 1, 2004 describes the techniques for stamping thermoplastic composite materials with continuous fibers. These operations of consolidation, repeat consolidation and systematic inspection have an adverse effect on the cost of parts and the productivity of the implemented method, while the faulty orientation of the fibers in the part leads to reduced mechanical properties of said part, and for aeronautics applications, extra mass for equivalent mechanical performance, or even does not allow the use of such parts in certain applications. For example, aircraft fuselage frames consist in L or U-shaped sections that are bent along a curvature radius above 2 meters for a medium-body aircraft. These frames are advantageously made up of a composite material with fiber reinforcement that is lighter than metallic materials, with equivalent mechanical strength. However, for such structural parts to be able to withstand the many mechanical stresses to which they may be subjected in normal service and in exceptional conditions, particularly in terms of buckling, these parts must be made with tight tolerances in respect of the direction of the reinforcing fibers in relation to the neutral line of the part, which direction tolerance is generally less than 1°. Thus, the method of the prior art does not make it possible to make a composite part with continuous reinforcement and a thermoplastic matrix meeting those tolerances.

The document WO 02/09935 describes a method that implements the stamping of a composite blank with a pre-consolidated thermoplastic matrix. The stamping method considered in that document is carried out by squeezing the edges of the blank during stamping, and so it is only adaptable for blanks reinforced with discontinuous fibers, with no control of inter-laminar slipping during the stamping operation, and with a variation of the thickness of said blank.

OBJECT AND SUMMARY OF THE INVENTION

The invention aims to remedy the drawbacks of the prior art and therefore relates to a method for forming a thermoplastic composite material with continuous fiber reinforcement by stamping, comprising the steps of:
 a. obtaining a flat blank, comprising a pre-consolidated stack of plies by automatic fiber placement of fibers referred to as thermoplastic pre-impregnated fibers;
 b. reheating said blank to a temperature greater than or equal to the melting temperature of the polymer making up the matrix;
 c. hot stamping the blank reheated in that way and consolidating the part thus formed between the stamping punch and die.

The term 'pre-consolidated' here refers to a stack of plies assembled with a porosity rate less than 1%, but without the creation of a continuous network of molecular chains in the thickness of the matrix. Such a blank is sufficiently rigid to be manipulated easily with no risk of upsetting the direction of the plies, but it is not fully consolidated and is not suitable for structural use, even light-duty use. Thus, the blank is laid up automatically at a very high speed, and the absence of gaps in the stack allows the fast and even heating of the blank. The fact that the blank is only consolidated in part favors inter-laminar slipping, even in the presence of viscosity variations in the blank, which also reduces tension in the fibers during stamping. Thus, the method according to the invention makes it possible to do away with several operations by comparison with the prior art, for a result that is equivalent or even improved in terms of quality.

When applied to thermoplastic fibers, the term 'pre-impregnated' is used here to refer to thermoplastic strands calendared with polymer film, powdered with thermoplastic polymer or comprising thermoplastic fibers co-mixed with reinforcing fibers. In all cases, the reinforcing fibers themselves are not impregnated or are only partly impregnated with the polymer. This type of product is a product that is effectively available in the market under the improper name of pre-impregnated fibers.

The invention can be implemented advantageously in the embodiments described below, which may be considered individually or in any technically operative combination.

Advantageously, the method according to the invention comprises, before step (a), a step of:
d. depositing the fibers oriented locally along the curvature of the blank over the entire length of the blank.

Thus, the direction of the reinforcements is substantially the same as the nominal direction at all points of the finished part, thus improving the resistance of said part to mechanical stress.

Advantageously, the step (d) is carried out by applying the fibers with sufficient pressure and temperature to obtain pre-consolidation of the stack, but at a depositing speed that is sufficiently high to not obtain the total consolidation of the stack. Thus, the method according to the invention makes it possible to reach high depositing speeds and therefore productivity. Further, the use of high depositing speed limits the time during which the interfaces of the deposited plies are exposed to air at high temperature, thus improving the characteristics of the matrix in the final part, particularly its crystallinity characteristics.

The method according to the invention is particularly suited to the case where the thermoplastic polymer is polyetheretherketone. That is because the high melting temperature of that material and its tendency to reticulation at high temperature in the presence of an oxidant atmosphere make it complicated to obtain the parts sought by the invention using the techniques of the prior art of laying up and in-situ consolidation or stamping, taken individually.

Advantageously, the step (d) of the method according to the invention comprises the depositing of fibers oriented at 0° in relation the curvature of the blank. That fiber direction makes it possible to keep the curved parts rigid in relation to radial stresses.

Advantageously, the step (d) comprises the depositing of fibers oriented along an angle α in relation to the curvature of the blank. After stamping, these fibers extend from one edge of the part to the other along the flanges in their respective planes, thus contributing to the buckling resistance of the composite part made.

The invention also relates to an aircraft with a fuselage comprising frames made of a composite material with fiber reinforcement and a PEEK matrix obtained by the method according to the invention. Strict specifications are applicable to such a frame in the area of the direction of fibers and in terms of resistance to impacts and fire. Further, it must be able to be mass-produced in a reproducible manner. The method according to the invention makes it possible to address those requirements by using a thermoplastic composite with a high-performance matrix and benefit from fire and impact resistance performance of the material and thus reduce the mass of the parts to be made in relation to the solutions of the prior art.

BRIEF DESCRIPTION OF THE DRAWINGS

The invention is described below in its preferred embodiments, which are not limitative in any way, and by reference to FIGS. 1 to 3, wherein:

FIG. 2A is a top view during the automatic laying up of the blank using the method according to the invention, FIG. 2B, a top view of the flat blank, FIG. 2C, along a section A-A defined in FIG. 2D, one section of the part after stamping showing the zones with low compacting at the ends of the flanges while FIG. 2D shows a perspective view of an example of the part obtained by the method according to the invention.

DETAILED DESCRIPTION OF THE EMBODIMENTS

Figure 1:
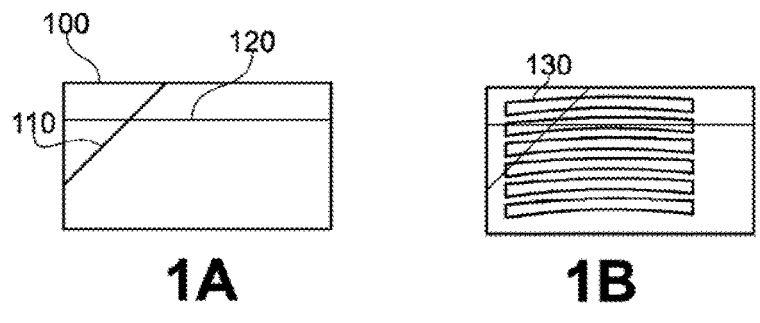
FIG. 1 relating to the prior art is a top view of the direction of fibers in composite blank with a thermoplastic matrix intended for stamping, FIG. 1A during the consolidation of the plate out of which the blanks are trimmed, and FIG. 1B during the trimming of nested parts.
Figure 2:
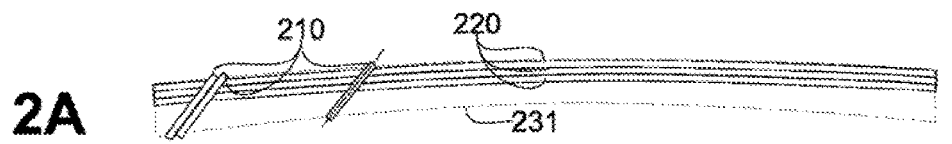
FIG. 2 is a schematic view of the making of a curved composite part with a thermoplastic matrix comprising two flanges extending in secant planes.
Figure 2:
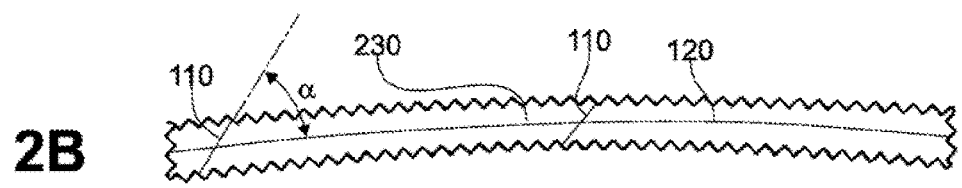
Figure 2:
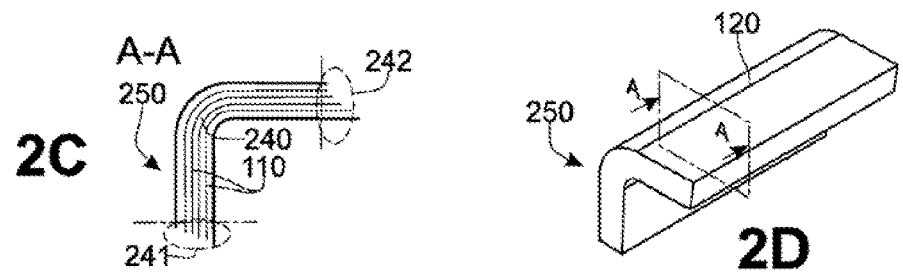

In FIG. 2A, in one exemplary embodiment of the method according to the invention, it comprises a first laying up step, consisting in depositing strips (210, 220) oriented in view of the actual contour (231) of the blank by placing fibers referred to as pre-impregnated fibers of thermoplastic polymer. Such depositing is carried out by using a numerically controlled automatic machine that places fibers, adapted for depositing fibers pre-impregnated with a thermoplastic polymer, particularly polyetheretherketone or PEEK. Thus, strips (220) oriented at 0° locally follow that direction in the blank. To that end, said strips (220) are deposited along curved trajectories.

Figure 3:
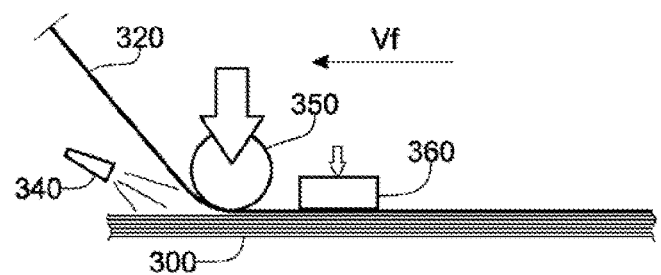
FIG. 3 is a schematic illustration along a profile view of an example of implementation of an automated fiber placement.

FIG. 3 shows the automatic depositing by placing fibers as known in the prior art. A strip (320) of fibers, referred to as pre-impregnated fibers, of a thermoplastic polymer, is deposited on a preform (300) made up of a stack of fibrous plies, which are also pre-impregnated. During the implementation of depositing as part of the method according to the invention, the interface between the strip (320) being deposited and the preform (300) is taken to a temperature equal to or slightly higher, by 5° C. to 10° C., than the melting temperature of the thermoplastic polymer, using heating means (340). These heating means may be a laser beam or the blowing of hot gas. The strip (320) is immediately pressed on the preform, by pressing means (350), for example by means of a pressure roller. Under the effect of that pressure and temperature, the strip (320) is welded to the preform (300). The pressure roller (350) and the heating means (340) move at an advance speed Vf as depositing is carried out, while tension means (not shown) provide the permanent tension of the undeposited part of the fibrous strip (320). Cooling means (360) moving with the pressure roller rapidly cool the deposited strip which is then part of the preform. According to the prior art, the laying up of pre-impregnated strips of a thermoplastic polymer using such a method is aimed at achieving the in-situ consolidation of the preform. To achieve such complete consolidation, it is necessary to control the time during which the strip (320) is kept at its temperature and pressed on the preform (300) and to heat both of them to a sufficient temperature, or close to 400° C. for PEEK, so that the molecular chains of the polymer constituting the matrix of the future composite are interlaced over the entire thickness of the deposited ply with those of the preform. This phenomenon is commonly called 'autohesion' and corresponds to the diffusion of segments of molecular chains through the interface. In the case of the depositing method according to the invention, such complete consolidation is not the aim, and the objective sought is the partial autohesion of the strip (320) and the preform (300) and the absence of gaps at the interface. To that end, depositing is carried out with heating temperature that is just sufficient to achieve welding at the interface, or approximately 350° C. for PEEK, without diffusion in the thickness of the ply, and with pressure sufficient to ensure compactness and bonding. These conditions allow depositing at a high speed Vf, while allowing a porosity rate in the preform less than 1%. The method of depositing by fiber placement makes it possible to deposit fibers along curved paths. This depositing method is known in the prior art and is referred to as 'steering'.

Returning to FIG. 2A, the strips (210) oriented along other directions, for example 45°, are also deposited so as to locally verify that direction.

In FIG. 2B, in the blank (230) achieved by the method according to the invention, the reinforcements at 0° (120) follow the curvature of the blank (230) and the reinforcements (110) oriented along an angle a retain that direction relative to the reinforcement at 0° throughout its length. The blank (230) is raised to a temperature greater than the melting temperature of the thermoplastic polymer that makes up the matrix of the future composite material, for example, with infrared radiation heating means. Then, the blank is stamped between a punch and a die according to a hot stamping method known in the prior art, to obtain the finished part (250).

In FIG. 2C, the stamping method uses phenomena of inter-laminar slipping and percolation of polymer between the plies and ends with a phase of compacting-consolidation of the part into shape, between the punch and the die. Thus, at the end of the stamping operation, the rough part comprises a majority portion (240) that is entirely compacted and consolidated, with a porosity rate less than 0.5%, and, at the ends of the flanges, uncompacted zones (241, 242) that are signs of inter-laminar slipping. These zones are eliminated by trimming with an abrasive water jet or with a cutting tool.

In FIG. 2D, the part (250) is finished at the end of trimming. The reinforcements (120) at 0° follow the curvature of the part, while the reinforcements (110) oriented along an angle α in relation to that direction extend from one edge of the part to the other and extend in both secant planes of the flanges, as shown in the sectional view of FIG. 2C. The fibrous reinforcements are already correctly oriented in the blank before stamping, are under reduced stress during forming and keep their nominal direction with tight tolerance.

The description above and the exemplary embodiments show that the invention reaches the objectives sought, particularly, by combining the automated laying up method and stamping, it makes it possible to obtain a curved part (250) comprising at least two flanges extending in secant planes and made up of a composite material with a high-performance thermoplastic matrix such as PEEK, with reinforcements that follow the nominal direction at all points of the part. Thus, the method according to the invention particularly makes it possible to make reinforcing frames of an aircraft fuselage.

The invention claimed is:

1. A method for making a composite part having at least two flanges with continuous fiber reinforcement in a polyetherethecketone thermoplastic polymer matrix, comprising:
    forming a pre-consolidated stack of plies in the form of a flat blank sheet with a curvature and a porosity less than 1% by depositing strips of fibers pre-impregnated with a polyetheretherketone thermoplastic matrix by automatic fiber placement;
    depositing an additional strip of fibers pre-impregnated with a polyetheretherketone thermoplastic polymer matrix on the flat blank sheet with fibers oriented locally along the curvature of the flat blank sheet over its entire length by heating the additional strip of fibers to a temperature equal to or higher than a melting temperature of the polyetheretherketone thermoplastic polymer matrix and steering the additional strip of fibers along the curvature while heating an interface between the additional strip of fibers and flat blank sheet to a temperature between 348° C. and 353° C. and pressing the additional strip of fibers on the flat blank sheet, wherein the depositing speed (Vf) causes welding of the additional strip of fibers on the flat blank sheet; but without diffusion of segments of molecular chains of polymer through the interface between the additional strip of fibers and the flat blank sheet;
    heating the flat blank sheet thus obtained to a temperature greater than or equal to the melting temperature of the polyetheretherketone thermoplastic polymer matrix; and
    hot stamping and consolidating the heated flat blank sheet between a stamping punch and a die to provide the composite part with continuous fiber reinforcement in a form of an extrusion comprising said at least two flanges.

2. The method according to claim 1, further comprising the step of depositing a strip of fibers oriented along an angle α in relation to the curvature of the flat blank sheet.

* * * * *